United States Patent
Hasegawa et al.

(10) Patent No.: US 11,418,684 B2
(45) Date of Patent: Aug. 16, 2022

(54) INFORMATION SYNCHRONIZATION DEVICE, INFORMATION SYNCHRONIZATION METHOD, AND INFORMATION SYNCHRONIZATION PROGRAM

(71) Applicant: Nippon Telegraph and Telephone Corporation, Tokyo (JP)

(72) Inventors: Keisuke Hasegawa, Tokyo (JP); Masato Ono, Tokyo (JP); Koji Namba, Tokyo (JP); Takahide Hoshide, Tokyo (JP); Tetsuya Yamaguchi, Tokyo (JP); Akira Ono, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/280,231

(22) PCT Filed: Sep. 13, 2019

(86) PCT No.: PCT/JP2019/036104
§ 371 (c)(1),
(2) Date: Mar. 26, 2021

(87) PCT Pub. No.: WO2020/066695
PCT Pub. Date: Apr. 2, 2020

(65) Prior Publication Data
US 2021/0344815 A1   Nov. 4, 2021

(30) Foreign Application Priority Data

Sep. 28, 2018   (JP) .............................. JP2018-185042

(51) Int. Cl.
*H04N 5/06*   (2006.01)
*H04N 5/38*   (2006.01)
(Continued)

(52) U.S. Cl.
CPC ................. *H04N 5/06* (2013.01); *G06T 7/70* (2017.01); *G06V 20/41* (2022.01); *H04N 5/38* (2013.01); *G06T 2207/10016* (2013.01)

(58) Field of Classification Search
CPC ... H04N 5/06; H04N 5/38; G06T 7/70; G06T 2207/10016; G06V 20/41
See application file for complete search history.

(56) References Cited

U.S. PATENT DOCUMENTS

| 8,698,955 B2 * | 4/2014 | Sullivan | ................... H04N 7/52 348/512 |
| 9,445,081 B1 * | 9/2016 | Kouperman | ............ G06T 15/00 |

(Continued)

FOREIGN PATENT DOCUMENTS

| JP | 2002-232839 | 8/2002 |
| JP | 2015-535378 | 12/2015 |

(Continued)

OTHER PUBLICATIONS

Ishii et al., "Kirari! Tracker: Human Detection and Tracking System by Using LiDAR and Deep Learning Engine," Video Information Media Society, Winter Games, 2017, 5 pages (with English Translation).

*Primary Examiner* — Brian P Yenke
(74) *Attorney, Agent, or Firm* — Fish & Richardson P.C.

(57) ABSTRACT

Matching timings of transmitting pieces of information for reproducing video and audio with presence and handling loss are provided. An information synchronization device is configured to synchronize, to a reference timestamp, data in which one or more labels for identifying respective one or more subjects on a video and one or more pieces of location information for identifying respective locations of the one or more subjects are respectively associated. The information synchronization device includes a reception unit for receiving the data at each time, a buffer for storing the received (Continued)

data, and a location information interpolation unit for generating, when pieces of the location information at times before and after the reference timestamp is stored into the buffer for any of the labels, location information of the label at the reference timestamp by interpolation using the pieces of the location information.

9 Claims, 12 Drawing Sheets

(51) Int. Cl.
*G06T 7/70* (2017.01)
*G06V 20/40* (2022.01)

(56) References Cited

U.S. PATENT DOCUMENTS

| | | | | |
|---|---|---|---|---|
| 10,133,933 | B1* | 11/2018 | Fisher | H04N 5/247 |
| 10,142,540 | B1* | 11/2018 | Ribeiro | H04N 5/247 |
| 10,349,091 | B2* | 7/2019 | Iguchi | H04L 65/4076 |
| 10,362,266 | B2* | 7/2019 | Arai | H04N 7/181 |
| 10,797,811 | B2* | 10/2020 | Kitazato | H04N 21/8586 |
| 10,878,585 | B1* | 12/2020 | Boulio | H04N 5/247 |
| 11,157,744 | B2* | 10/2021 | Barzelay | G06F 16/7837 |
| 2002/0097893 | A1 | 7/2002 | Lee et al. | |
| 2012/0314907 | A1* | 12/2012 | Casamona | G06T 7/20 382/103 |
| 2014/0111433 | A1 | 4/2014 | Solomon et al. | |
| 2017/0094259 | A1* | 3/2017 | Kouperman | H04N 13/111 |
| 2018/0225539 | A1* | 8/2018 | Fathi | G06T 17/00 |
| 2019/0130191 | A1* | 5/2019 | Zhou | G06V 10/255 |
| 2019/0220668 | A1* | 7/2019 | Siskind | G06K 9/6296 |
| 2019/0385312 | A1* | 12/2019 | Grundström | G06T 7/70 |
| 2020/0211278 | A1* | 7/2020 | Sharp | G01C 21/206 |
| 2020/0294311 | A1* | 9/2020 | Holz | G06V 20/20 |
| 2020/0302241 | A1* | 9/2020 | White | G06N 20/20 |
| 2021/0004601 | A1* | 1/2021 | Lancia | G06V 20/48 |
| 2021/0099737 | A1* | 4/2021 | Ren | G06T 7/20 |
| 2021/0365716 | A1* | 11/2021 | Li | H04N 5/247 |
| 2022/0028105 | A1* | 1/2022 | Hasegawa | G06T 7/70 |
| 2022/0051420 | A1* | 2/2022 | Forsgren | G06T 7/70 |
| 2022/0114749 | A1* | 4/2022 | Hasegawa | G06V 10/25 |

FOREIGN PATENT DOCUMENTS

| | | |
|---|---|---|
| JP | 2017-130209 | 7/2017 |
| JP | 2017-208631 | 11/2017 |
| JP | 2018-120402 | 8/2018 |

* cited by examiner

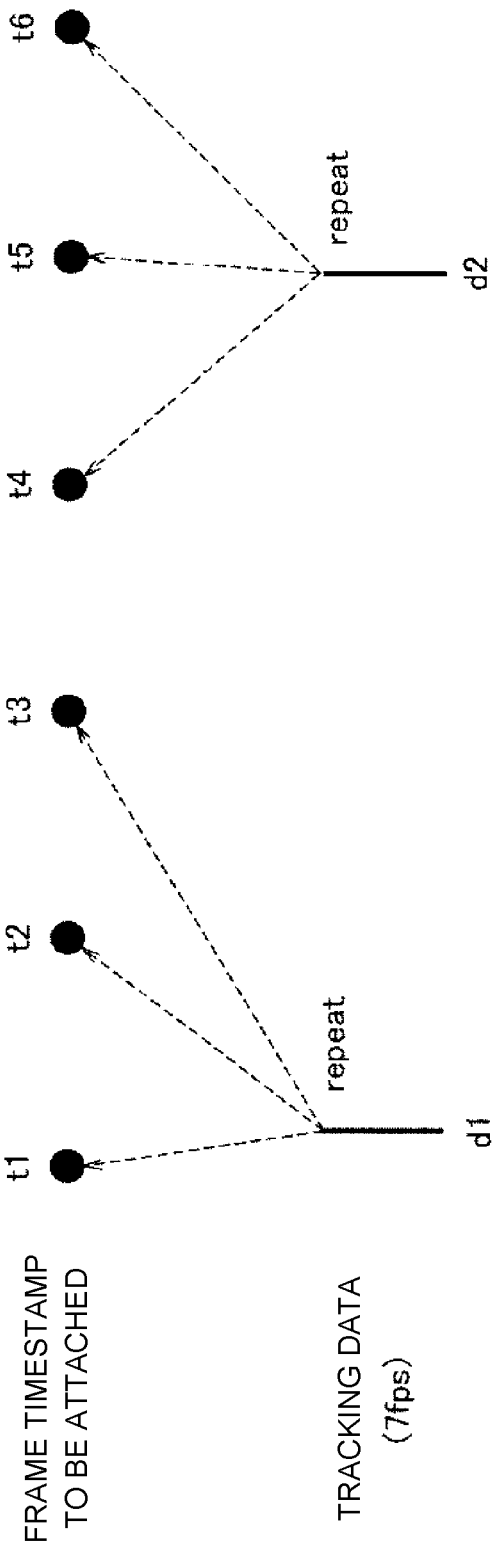

INFORMATION SYNCHRONIZATION
DEVICE, INFORMATION
SYNCHRONIZATION METHOD, AND
INFORMATION SYNCHRONIZATION
PROGRAM

CROSS-REFERENCE TO RELATED
APPLICATIONS

This application is a National Stage application under 35 U.S.C. § 371 of International Application No. PCT/JP2019/036104, having an International Filing Date of Sep. 13, 2019, which claims priority to Japanese Application Serial No. 2018-185042, filed on Sep. 28, 2018. The disclosure of the prior application is considered part of the disclosure of this application, and is incorporated in its entirety into this application.

TECHNICAL FIELD

The present invention relates to a technique for synchronizing and interpolating sensor information.

BACKGROUND ART

Research and development of technologies for temporally and spatially reproducing situations of on-site venues at destinations of transmission has been conducted not only video and audio captured at the on-site venues but also information for reproducing, at remote sites, the on-site venues such as three-dimensional location information and environments of subjects.

In order to reproduce the on-site venues temporally and spatially, time-series data of three-dimensional location information of each subject included in the video is required. Thus, it is necessary to generate the time-series data of the three-dimensional location information for each subject by using data regarding location information of the subject acquired by sensors and video data. In Non-Patent Document 1, pieces of three-dimensional location information of subjects are acquired by LiDAR, and are associated with results of tracking persons in video data by deep learning using TinyYOLO, thereby generating time-series data of the three-dimensional location information for each subject.

CITATION LIST

Non-Patent Literature

Non-Patent Literature 1: Yoko Ishii, Tetsuro Tokunaga, Yoshihide Tonomura, Kota Hidaka, "Kirari! Tracker: Study of real-time specific person tracking system using LiDAR and deep learning engine", Winter Conference of The Institute of Image Information and Television Engineers 2017.

SUMMARY OF THE INVENTION

Technical Problem

In Non-Patent Literature 1, association of pieces of three-dimensional information is performed using a video frame from which persons are extracted by TinyYOLO as a reference. In other words, a label is attached to each person in the video frame to associate three-dimensional location information to each label (person). When there is no LiDAR data at a time corresponding to the video frame from which the person is extracted, association is performed using before and after LiDAR data.

Here, in a situation where there are multiple subjects (labels) in the frame, some subjects may not be detected depending on the frame. In other case, some pieces of sensor information from multiple sensors identifying location information may be lost. Non-Patent Literature 1 is unable to handle such partial loss of data. Moreover, a simple method of ignoring lost information or waiting until pieces of information are available cause problems such as lower accuracy and transmission delay of finally generated three-dimensional location information data for each subject.

The present invention has been made in view of the above, and an objective is to provide information synchronization technique capable of generating three-dimensional location information data for each subject synchronized with a predetermined time (reference timestamp) even when information is partially lost.

Means for Solving the Problem

An information synchronization device according to the present invention is configured to synchronize, to a reference timestamp, data in which one or more labels for identifying respective one or more subjects on a video and one or more pieces of location information for identifying respective locations of the one or more subjects are respectively associated. The information synchronization device includes: a reception unit for receiving the data at each time; a buffer for storing the received data; and a location information interpolation unit for generating, when pieces of the location information at times before and after the reference timestamp is stored into the buffer for any of the labels, location information of the label at the reference timestamp by interpolation using the pieces of the location information.

An information synchronization device according to the present invention is configured to synchronize, to a reference timestamp, data in which one or more labels for identifying respective one or more subjects on a video and one or more pieces of location information for identifying respective locations of the one or more subjects are respectively associated. The information synchronization device includes: a reception unit configured to receive the data at each time; and a location information synchronization unit configured to allocate the location information to the reference timestamp at a time within a short period close to or including a timestamp of the location information, wherein the location information synchronization unit allocates, when another piece of location information has already been allocated to the reference timestamp to which the location information is to be allocated, no location information to the reference timestamp, and allocates the location information to the reference timestamp to which no location information has been allocated among the reference timestamps within a predetermined period close to or including the timestamp of the location information.

An information synchronization method according to the present invention is configured to synchronize, to a reference timestamp, data in which one or more labels for identifying respective one or more subjects on a video and one or more pieces of location information for identifying respective locations of the one or more subjects are respectively associated. The information synchronization method includes: a step of receiving, by a computer, the data at each time; a step of storing, by the computer, the received data into a buffer; and a step of generating, by the computer, upon pieces of the location information at times before and after the reference timestamp being stored into the buffer for any of the labels, location information of the label at the reference timestamp by interpolation using the pieces of the location information.

An information synchronization method according to the present invention is configured to synchronize, to a reference timestamp, data in which one or more labels for identifying respective one or more subjects on a video and one or more pieces of location information for identifying respective locations of the one or more subjects are respectively associated. The information synchronization method includes: a step of receiving, by a computer, the data at each time; and a step of allocating, by the computer, the location information to the reference timestamp at a time within a short period close to or including a timestamp of the location information, wherein the step of allocating the location information includes allocating, when another piece of location information has already been allocated to the reference timestamp to which the location information is to be allocated, no location information to the reference timestamp, and allocating the location information to the reference timestamp to which no location information has been allocated among the reference timestamps within a predetermined period close to or including the timestamp of the location information.

An information synchronization program according to the present invention causes a computer to operate as each unit of the information synchronization device described above.

Effects of the Invention

According to the present invention, it is possible to generate three-dimensional location information data for each subject synchronized with a predetermined time (reference timestamp) even when information is partially lost.

BRIEF DESCRIPTION OF DRAWINGS

FIG. 14 is a diagram for specifically describing another process of a sensor information synchronization unit.

DESCRIPTION OF EMBODIMENTS

First Embodiment

A first embodiment of the present invention will be described below with reference to the drawings.

Figure 1:
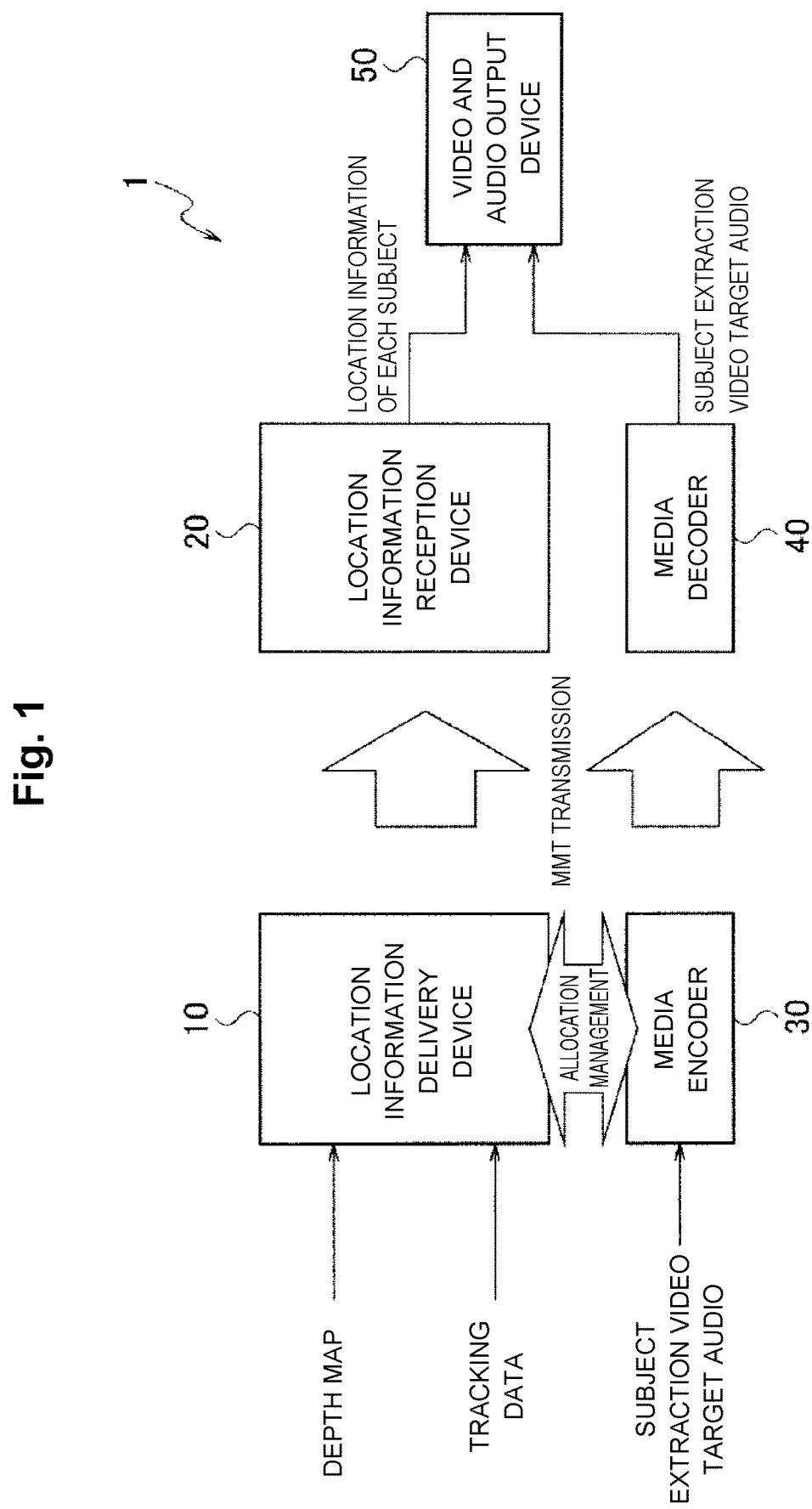
FIG. 1 is an overall architecture diagram of an immersive telepresence system according to the present embodiment.

FIG. 1 is an overall architecture diagram of a transmission apparatus according to the present embodiment.

A transmission apparatus 1 illustrated in FIG. 1 includes a location information delivery device 10 and a media encoder 30 on a capturing site such as a stadium, and includes a location information reception device 20, a media decoder 40, and a video and audio output device 50 on a display side such as a public viewing venue.

The location information delivery device 10 receives and integrates sensor information (e.g., a depth map and tracking data) indicating a location of each subject captured by a sensor or an external server placed in the capturing site, and generates three-dimensional location information for each subject matched to a frame rate of a video. The generated information is transmitted using, for example, Advanced MPEG media transport (Advanced MMT). Advanced MMT is capable of using coordinated universal time (UTC) for a presentation time of video, audio, etc., thus even when transmission paths are different as in a case of broadcasting and communication, contents can be synchronously displayed on a terminal side. However, the present invention is not limited to transmission by MMT, and any data transmission method may be used. The location information delivery device 10 transmits location information of each subject synchronized with the video to the location information reception device 20.

The location information reception device 20 holds the received location information of each subject, converting the location information of each subject to a specified frame rate in response to a location information acquisition request from the video and audio output device 50 to output the converted location information. Methods of the output include, for example, push delivery by Websocket interface and delivery with buffering by MIDI interface.

The media encoder 30 encodes video and audio of the captured subjects to transmit the encoded video and audio to the media decoder 40.

The media decoder 40 decodes the received video and audio to transmit the decoded video and audio to the video and audio output device 50.

The video and audio output device 50 temporally and spatially reproduces a source of transmission (a capturing site) from transmitted information to present the reproduced source of transmission. The video and audio output device 50, for example, is configured with a video received from the media decoder 40, a display device (a three-dimensional display device capable of presenting depth), an audio signal received from the media decoder 40, and an audio device (a sound image localization device). The display device displays a three-dimensional video by controlling a location and a size of a video material on a basis of the location information of each subject received from the location information reception device 20. The audio device reproduces sounds perceived as if the sounds are emitted from responsive location each corresponding to a location of each subject on a basis of the location information of each subject received from the location information reception device 20.

Next, the location information delivery device 10 according to the present embodiment will be described.

Figure 2:
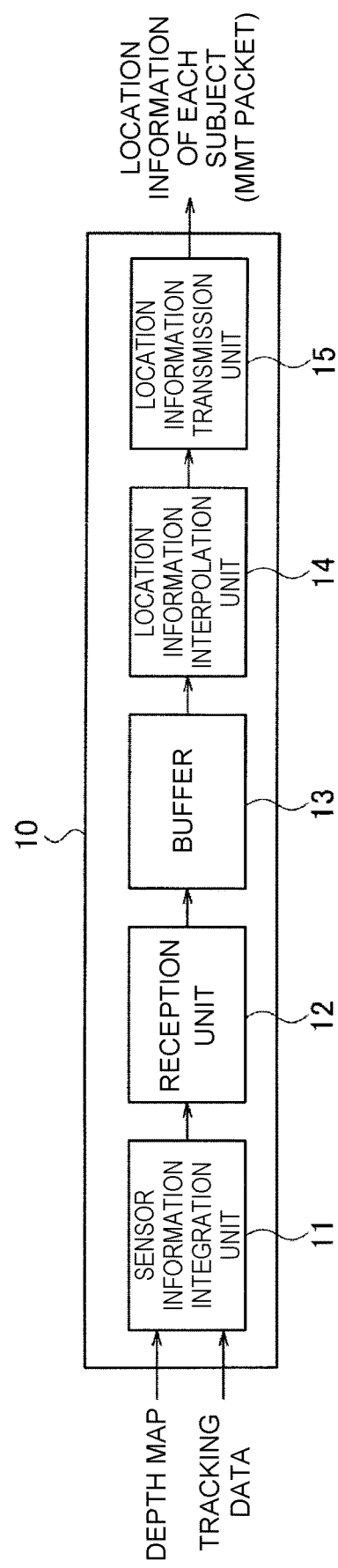
FIG. 2 is a functional block diagram illustrating an architecture of a location information delivery device according to the present embodiment.

FIG. 2 is a functional block diagram illustrating an architecture of the location information delivery device 10 according to the present embodiment. The location information delivery device 10 includes a sensor information integration unit 11, a reception unit 12, a buffer 13, a location information interpolation unit 14, and a location information transmission unit 15.

The sensor information integration unit 11 receives data capable of identifying a three-dimensional location acquired by the sensor and tracking data extracted from the video, generating location information (three-dimensional location information for each subject) in which a label of the object (subject) is associated with corresponding three-dimensional coordinate information of the object. The data capable of identifying the three-dimensional location includes, for example, a depth map (a disparity map). The depth map is data in which disparity information is converted into distance information by triangulation on a basis of magnitude of pixel-by-pixel displacement between images captured by a stereo camera. The data capable of identifying the three-dimensional location is not limited to the depth map, and may be, for example, a mask video generated based on a video captured by a monocular camera, as long as data is capable of identifying three-dimensional location of an object (a location particularly in a depth direction).

The tracking data includes a sequence in which one or more label identifying respective one or more objects included in each frame and one or more pieces of coordinate information of the respective one or more objects in the frame, extracted from the video, are associated with each other. That is, the tracking data is three-dimensional data including data capable of identifying two-dimensional location information (temporal change in location) of each object extracted from the video and data capable of identifying a location in a depth direction acquired by the sensor.

The sensor information integration unit 11 extracts coordinate information of a contour of the object from the data capable of identifying the three-dimensional location, and extracts a location of the object in the video frame and a label of the object from the tracking data, then integrating the data capable of identifying the three-dimensional location and the tracking data.

Hereinafter, by taking a case where the data capable of identifying the three-dimensional location is the depth map as an example, a specific example of a process of the sensor information integration unit will be described that associates the data capable of identifying the three-dimensional location information acquired by the sensor with the data capable of identifying the two-dimensional location of the object extracted from the video.

Figure 3:
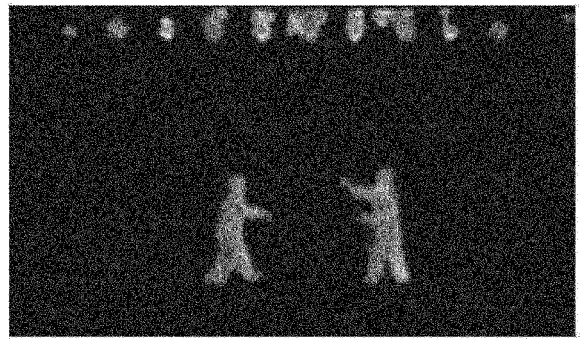
FIG. 3 is a diagram illustrating an example of a depth map.
Figure 4:
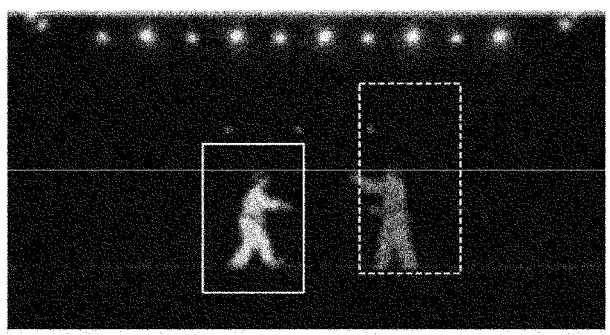
FIG. 4 is a diagram illustrating an example of tracking data.

FIG. 3 illustrates an example of the depth map, and FIG. 4 illustrates an example of the tracking data.

Figure 5:
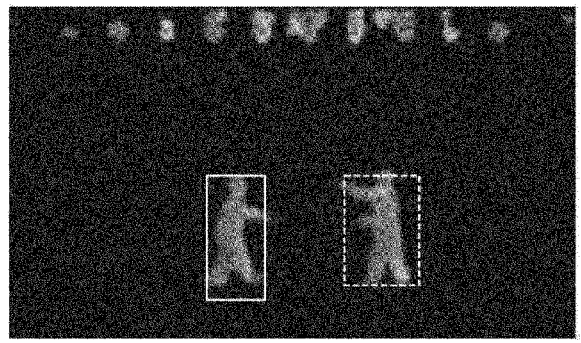
FIG. 5 is a diagram illustrating an example of integrating a depth map and tracking data.

The sensor information integration unit 11 converts pieces of coordinate information of the depth map and the tracking data into pieces of coordinate information having a common available format, associating the depth map and the tracking data on a basis of the converted pieces of coordinate information. That is, the sensor information integration unit 11 identifies the object indicated by the tracking data corresponding to the three-dimensional coordinate information extracted from the depth map, attaching the label to the three-dimensional coordinate information. FIG. 5 illustrates an example of integrating the depth map and the tracking data. The three-dimensional coordinate information with the label attached is location information of each subject.

For example, using the maximum and the minimum of the depth map, or the mode of the depth map as a Z value (depth) and calculating an X value (width) and a Y value (height) by using a contour, a depth, and an internal parameter of the depth map result in local coordinates (X value, Y value, Z value) which are coordinate information after conversion of the three-dimensional coordinate information of the depth map. The resultant local coordinates are converted into a common coordinate system (global coordinate system) also available for the tracking data.

Alternatively, using the local coordinate system of the tracking data as a Z value (depth) and using an X value (width) and a Y value (height) calculated from the contour, the depth, and the internal parameter of the depth map as an X value and a Y value result in the local coordinates (X value, Y value, Z value) which are the coordinate information after conversion of the tracking data. The resultant local coordinates are converted into the global coordinate system.

Alternatively, converting the local coordinate system of the tracking data into the global coordinate system and using a result of calculating the centroid point of a rectangle for identifying the object in the global coordinate system as the coordinate information of the tracking data (coordinate information after conversion) result in a common available format with the coordinate information of the depth map.

Use of sets of data in the common coordinate system obtained by conversion using any of the above methods allows both sets of data to be associated with each other.

The reception unit 12 receives location information of each label corresponding to the subject at each time. The location information of each label is, for example, data obtained by the sensor information integration unit 11 integrating the data capable of identifying the three-dimensional location obtained by the sensor and the tracking data extracted from the video.

The buffer 13 holds the location information received by the reception unit 12.

The location information interpolation unit 14 generates, when the buffer 13 holds pieces of location information at times before and after a reference timestamp for any of the labels, location information at the reference timestamp for the label by interpolation. The reference timestamp is determined so as to be synchronized with each frame of the video on a basis of a timestamp of the video.

Figure 6:
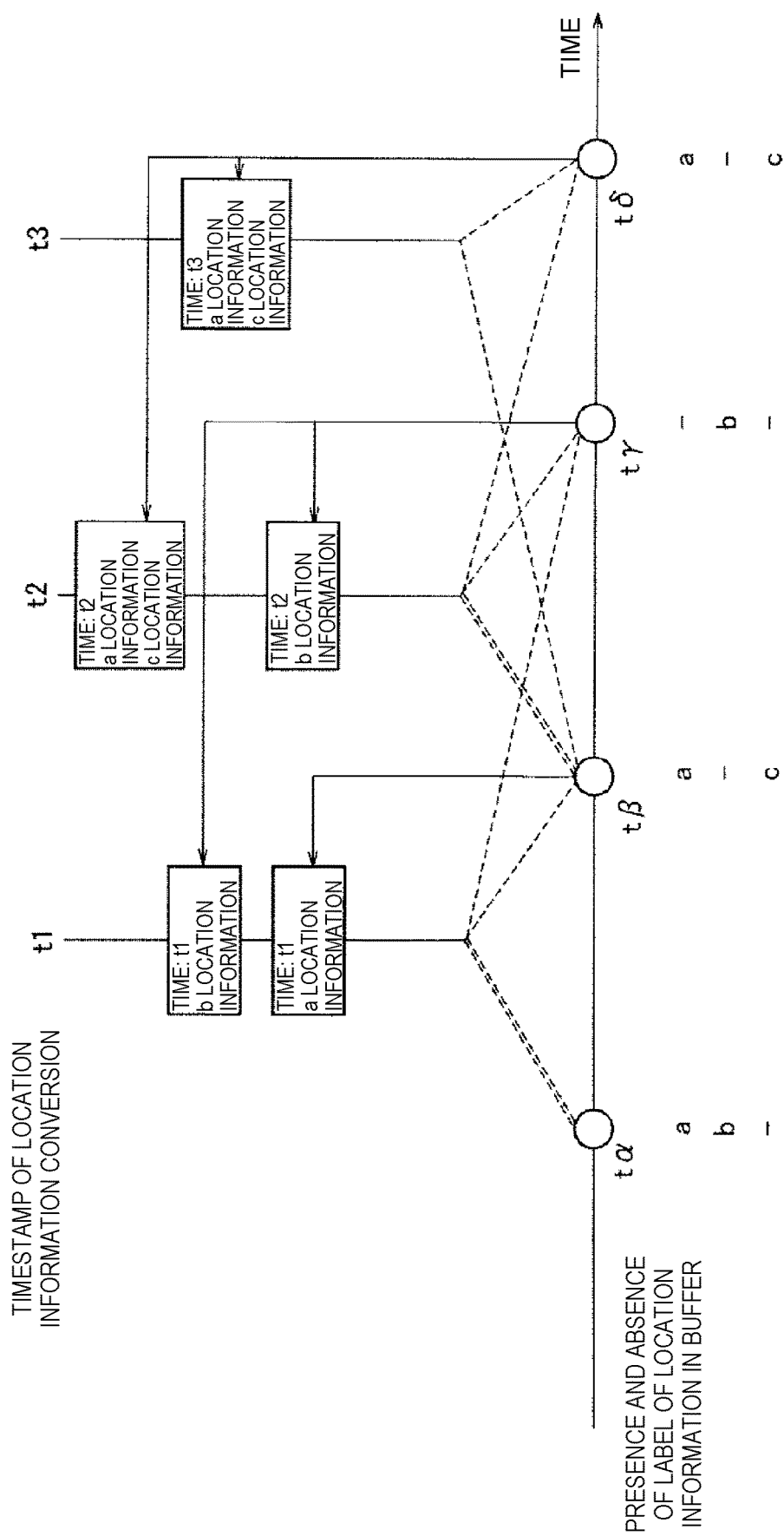
FIG. 6 is a diagram for specifically describing a generation timing of location information for each label.

FIG. 6 is a diagram for specifically describing a process of the location information interpolation unit 14. Times t1, t2, and t3 denote the reference timestamps. Times tα, tβ, tγ, and tΔ denote timestamps (e.g., a time at which sensor information arrives) attached to respective pieces of the location information held by the buffer 13. Character "a", "b", and "c" described under the times tα, tβ, tγ, and tΔ denote labels of the location information included in data at each time. The data may include pieces of the location information of the labels a, b, and c, and the location information of any of the labels may be lost. For example, in FIG. 6, data at the time tα includes pieces of the location information of the label a and the label b, and the location information of the label c is lost.

Generation timing of the location information for each label will be described. At the time tα, data including pieces of the location information of the labels a and b arrives at the buffer 13. At the time tβ, data including pieces of the location information of the labels a and c arrives at the buffer 13. For the label a, pieces of the location information at the times tα and tβ before and after the time t1 are available. For the label b, no location information at a time after the time t1 is available, and for the label c, no location information at a time before the time t1 is available. The location information interpolation unit 14 generates location information of the label a at the time t1 by linear interpolation of pieces of the location information of the label a at the times tα and tβ, transmitting the generated location information to the location information transmission unit 15. For the labels b and c, location information at the time t1 is not generated at this time.

At the time tγ, data including the location information of the label b arrives at the buffer 13. For the label b, pieces of the location information at the times tα and tγ before and after the times t1 and t2 are available. For the labels a and c, no location information at a time after the time t2 is available. The location information interpolation unit 14 generates pieces of location information of the label b at the respective times t1 and t2 by linear interpolation of pieces of the location information of the label b at the respective times tα and tγ, transmitting the generated pieces of location information to the location information transmission unit 15.

At the time tΔ, data including pieces of the location information of the labels a and c arrives at the buffer 13. For the labels a and c, pieces of the location information at the times tβ and tΔ before and after the times t2 and t3 are available. For the label b, no location information at a time after the time t3 is available. The location information interpolation unit 14 generates pieces of location information of the labels a and c at the respective times t2 and t3 by linear interpolation of pieces of the location information of the labels a and c at the times tβ and tΔ, transmitting the generated pieces of location information to the location information transmission unit 15.

In this way, the location information interpolation unit 14 generates, when pieces of the location information of each label necessary for linear interpolation are available, location information for each label at a reference timestamp.

The location information transmission unit 15 receives the location information of each label from the location information interpolation unit 14, transmitting a MMT packet including the location information of each label (the location information of each subject) at a timing of transmitting the MMT packet in synchronization with the video.

Next, a process flow of the location information delivery device 10 will be described.

Figure 7:
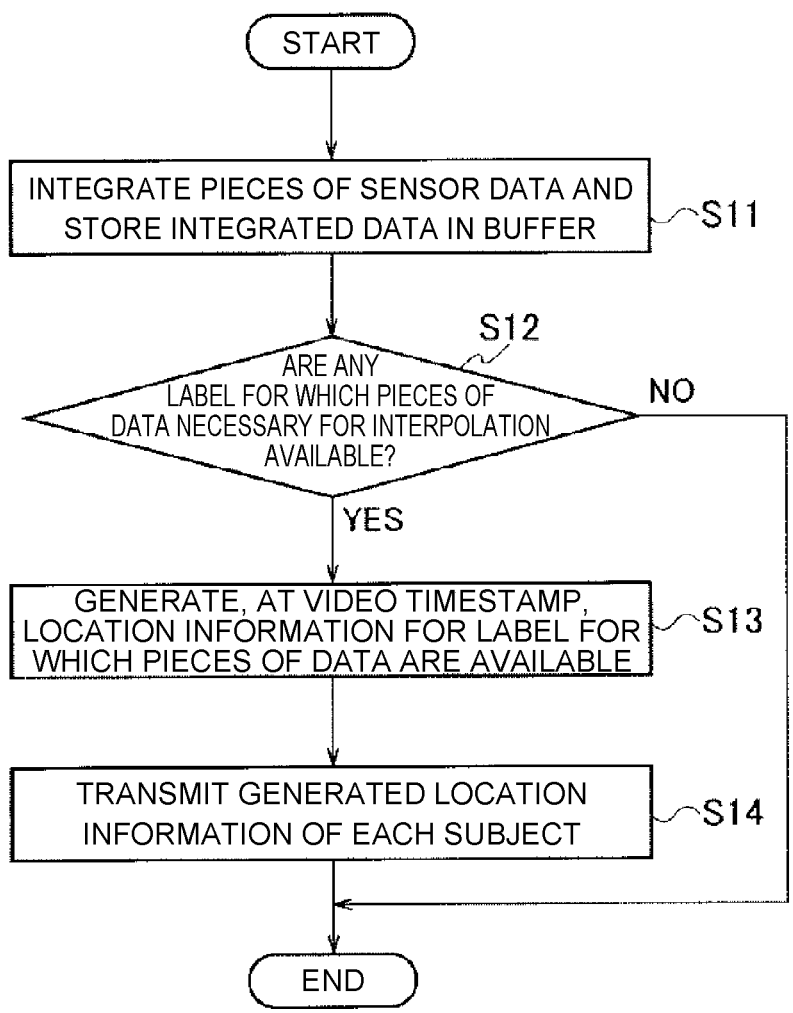
FIG. 7 is a flowchart illustrating a process flow of a location information delivery device according to the present embodiment.

FIG. 7 is a flowchart illustrating a process flow of the location information delivery device 10.

On receiving the depth map and the tracking data, the sensor information integration unit 11 integrates the depth map and the tracking data to transmit the integrated data to the reception unit 12, storing the data into the buffer 13 (step S11). Reception timings and frequencies of the depth map and the tracking data are different, thus the sensor information integration unit 11 integrates sets of data when the sets of the data necessary for the integration are available.

The location information interpolation unit 14 determines whether there is any label for which sets of data necessary for the interpolation of location information at a reference timestamp are available (step S12).

When there is no label for which the sets of data are available (NO in step S12), the location information interpolation unit 14 ends the process and waits for arrival of next data.

When there is any label for which the sets of data are available (YES in step S12), the location information interpolation unit 14 generates, at the reference timestamp, location information for the label for which the sets of data are available (step S13).

The location information transmission unit 15 transmits the MMT packet including the location information of each subject (step S14).

Note that when processes of steps S11 to S14 are completed, the processes of steps S11 to S14 are repeated with the next data as an object to process.

Next, the location information reception device 20 according to the present embodiment will be described.

Figure 8:
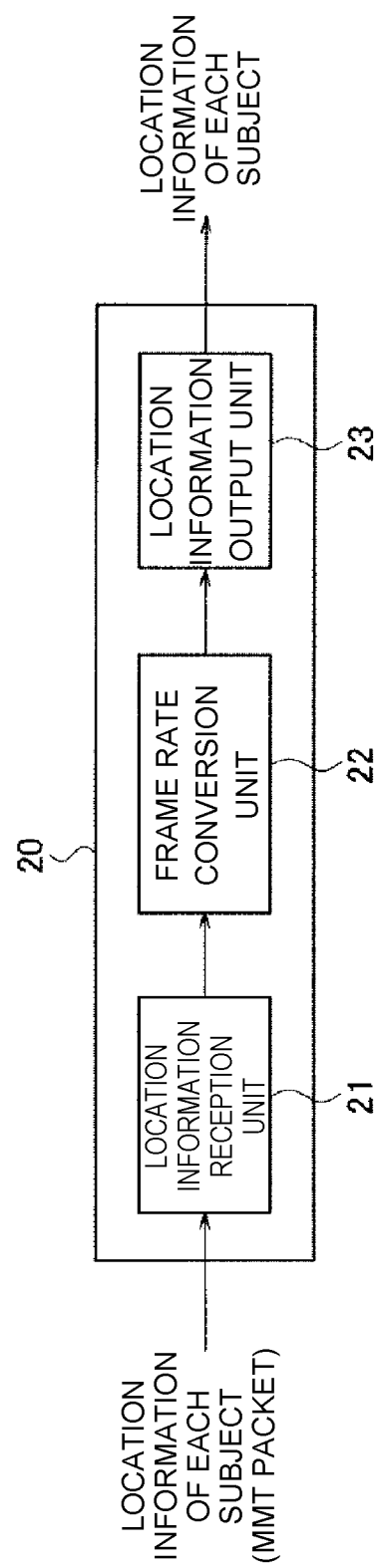
FIG. 8 is a functional block diagram illustrating an architecture of a location information reception device according to the present embodiment.

FIG. 8 is a functional block diagram illustrating an architecture of the location information reception device 20 according to the present embodiment. The location information reception device 20 includes a location information reception unit 21, a frame rate conversion unit 22 and a location information output unit 23.

The location information reception unit 21 receives the MMT packet including the location information of each subject and obtains the location information of each subject.

The frame rate conversion unit 22 converts, on a basis of a frame rate specified from the video and audio output device 50, a frame rate of the location information into the specified frame rate. A frame rate of the location information received by the location information reception unit 21 is based on a timing at which the location information delivery device 10 generates the location information. The frame rate of the location information is, for example, assumed to be 60 frames per second (fps) to match a frame rate of the video. When the video and audio output device 50 specifies a frame rate of 15 fps, the frame rate conversion unit 22 converts the location information at 60 fps into the one at 15 fps. Location information at a timing corresponding to a frame rate after the conversion is calculated as coordinates linear to preceding and following frames at a frame rate before the conversion.

Figure 9:
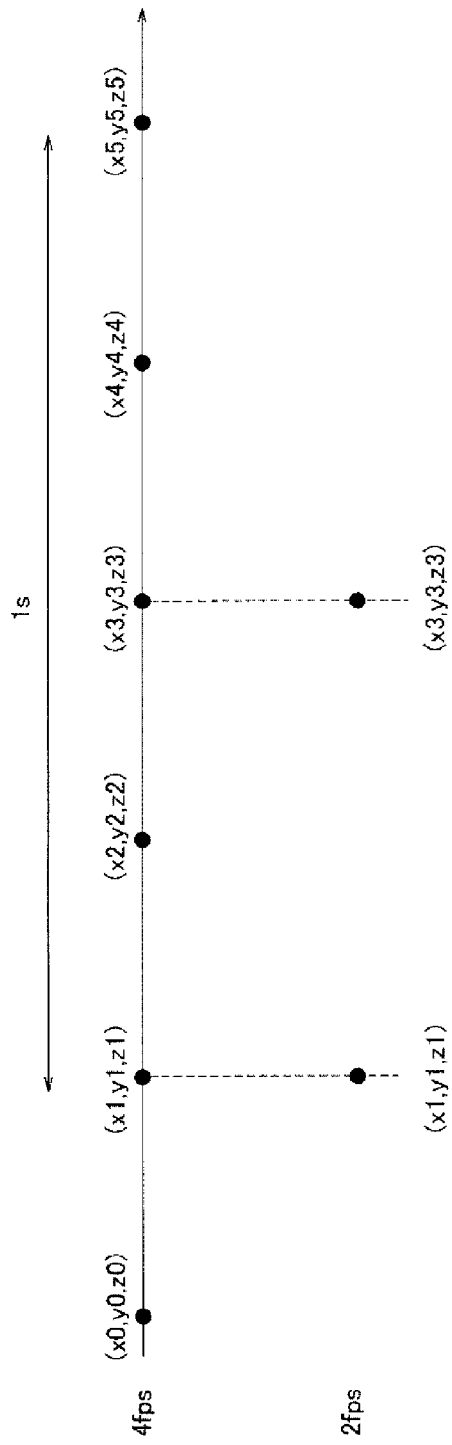
FIG. 9 is a diagram for describing a frame rate conversion process.
Figure 10:
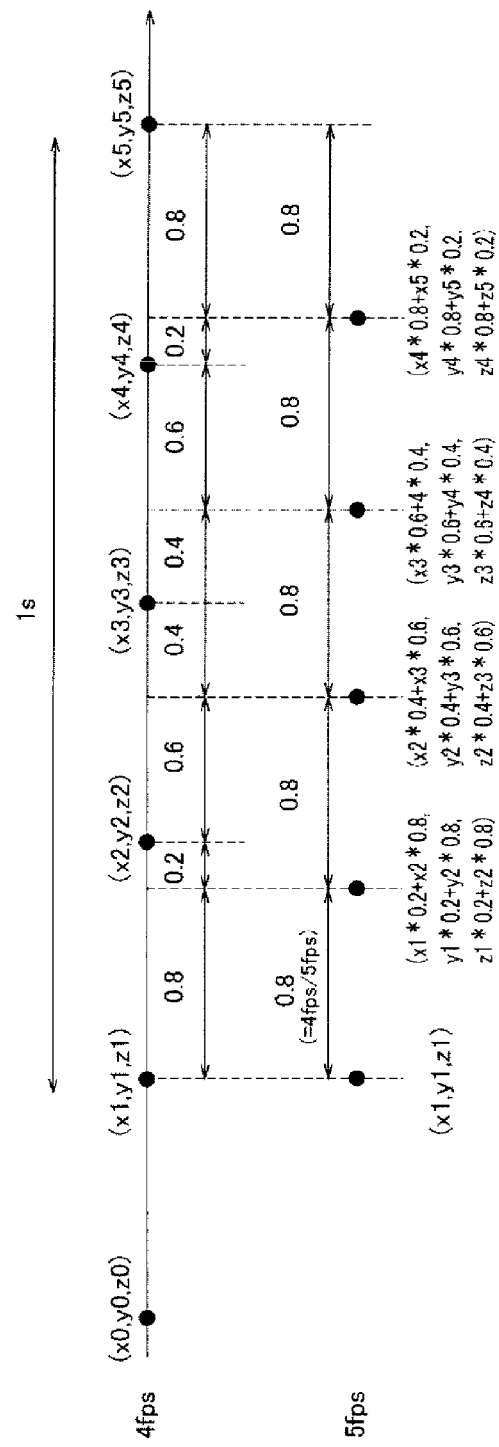
FIG. 10 is a diagram for describing a frame rate conversion process.

A process of frame rate conversion will be described with reference to FIGS. 9 and 10. In FIGS. 9 and 10, a frame rate of received location information is assumed to be 4 fps for ease of description.

In an example in FIG. 9, the location information is converted to 2 fps. When a specified frame rate is a divisor of the frame rate of the received location information, location information corresponding to an output timing is available, thus the corresponding location information may be output. In the example of FIG. 9, four pieces of location information are received in one second and two pieces of location information are output in one second. Specifically, the frame rate conversion unit 22 outputs (x1, y1, z1) and (x3, y3, z3) out of pieces of the location information. For loss of the corresponding location information, interpolation is performed using pieces of location information before and after the corresponding location information. Here, although (x, y, z) is used as the location information in FIGS. 9 and 10, for example, a bounding box surrounding the subject may be used as the location information.

In an example of FIG. 10, the location information is converted to 5 fps. For loss of location information corresponding to an output timing, interpolation is performed using pieces of location information before and after. In the example of FIG. 10, location information at a timing between pieces of location information at (x1, y1, z1) and (x2, y2, z2) is required, thus linear interpolation is performed using (x1, y1, z1) and (x2, y2, z2) as (x1×0.2+x2×0.8, y1×0.2+y2×0.8, z1×0.2+z2×0.8).

The location information output unit 23 outputs location information with a frame rate converted by the frame rate conversion unit 22.

When a plurality of the video and audio output devices 50 are connected to the location information reception device 20 and specify respective different frame rates, the location information reception device 20 performs respective frame rate conversions for the respective video and audio output devices 50 to deliver the location information.

Note that the location information delivery device 10 may have a function of frame rate conversion.

As described above, according to the present embodiment, the sensor information integration unit 11 integrates a depth map and tracking data, storing location information that is three-dimensional coordinate information a label attached into the buffer 13. The location information interpolation unit 14, then, generates location information at a reference timestamp for a label for which pieces of location information before and after the reference timestamp are available by interpolation, thereby allowing transmission timings of sensor information to be synchronized with the reference timestamps and lost information to be interpolated. That is, the location information delivery device 10 functions as an information synchronization device that generates three-dimensional location information for each subject synchronized with the reference timestamp by synchronizing data identifying three-dimensional location with video data.

The information synchronization device (the location information delivery device 10) according to the present embodiment generates, even when tracking data includes multiple labels, location information for each label by interpolation without waiting until all pieces of location information of the included multiple labels are available, thereby suppressing delay over the entire system.

According to the present embodiment, the location information reception device 20 converts a frame rate into a specified frame rate, thereby allowing location information of each subject at a reception frequency and a reception timing required by the video and audio output device 50 to be output.

Second Embodiment

A second embodiment of the present invention will be described below with reference to the drawings.

An overall architecture of the transmission apparatus is the same as that of the first embodiment. The second embodiment is different from the first embodiment in a process of the location information delivery device 10 matching location information of each subject to a frame rate of the video.

Figure 11:
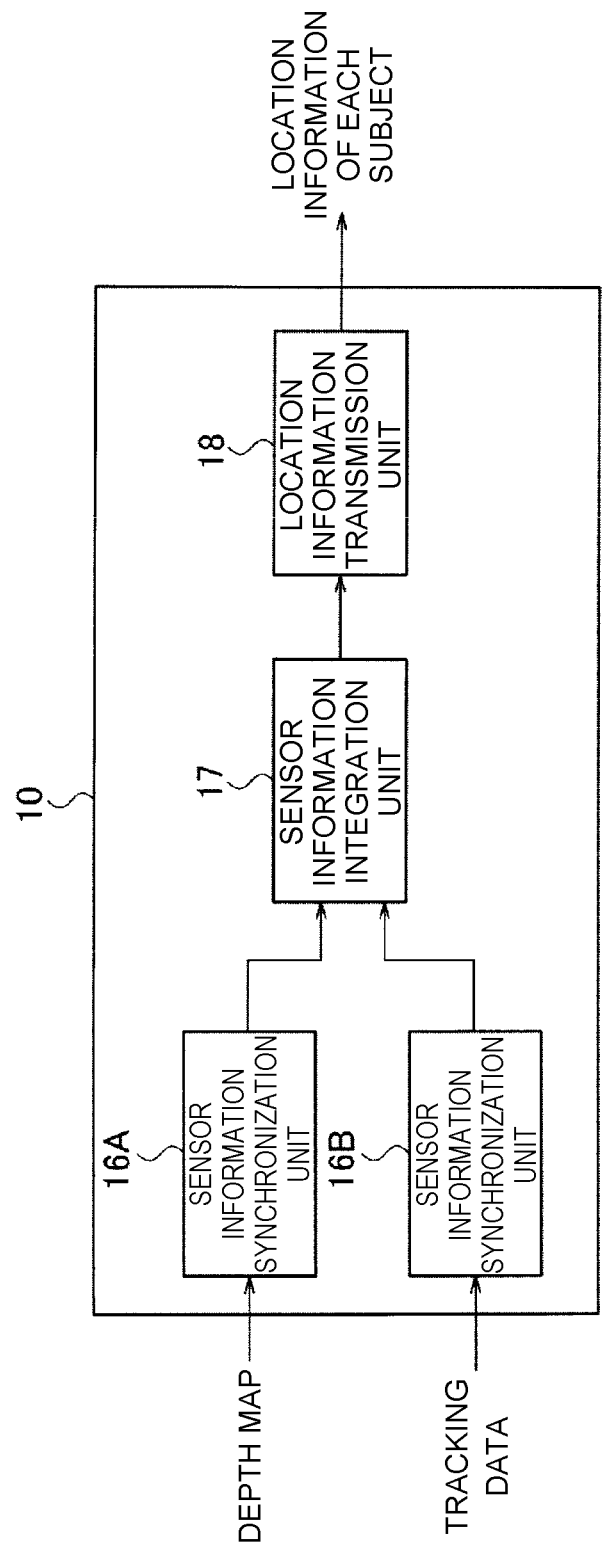
FIG. 11 is a functional block diagram illustrating an architecture of a location information delivery device according to a second embodiment.

FIG. 11 is a functional block diagram illustrating an architecture of the location information delivery device 10 according to the second embodiment. The location information delivery device 10 includes sensor information synchronization units 16A and 16B, a sensor information integration unit 17, and a location information transmission unit 18.

The sensor information synchronization units 16A and 16B receive the depth map and the tracking data to allocate each of the received sets of data to respective reference timestamps. Details of a process of allocating the data to the reference timestamp will be described later.

The sensor information integration unit 17 generates location information by integrating a label of the subject and three-dimensional coordinate information of the object at the reference timestamp on a basis of the depth map and the tracking data allocated to the reference timestamp.

The location information transmission unit 18 receives the location information of each subject from the sensor information integration unit 17 to transmit an MMT packet including the location information of each subject at a predetermined timing.

Next, processes of the sensor information synchronization units 16A and 16B will be described.

Figure 12:
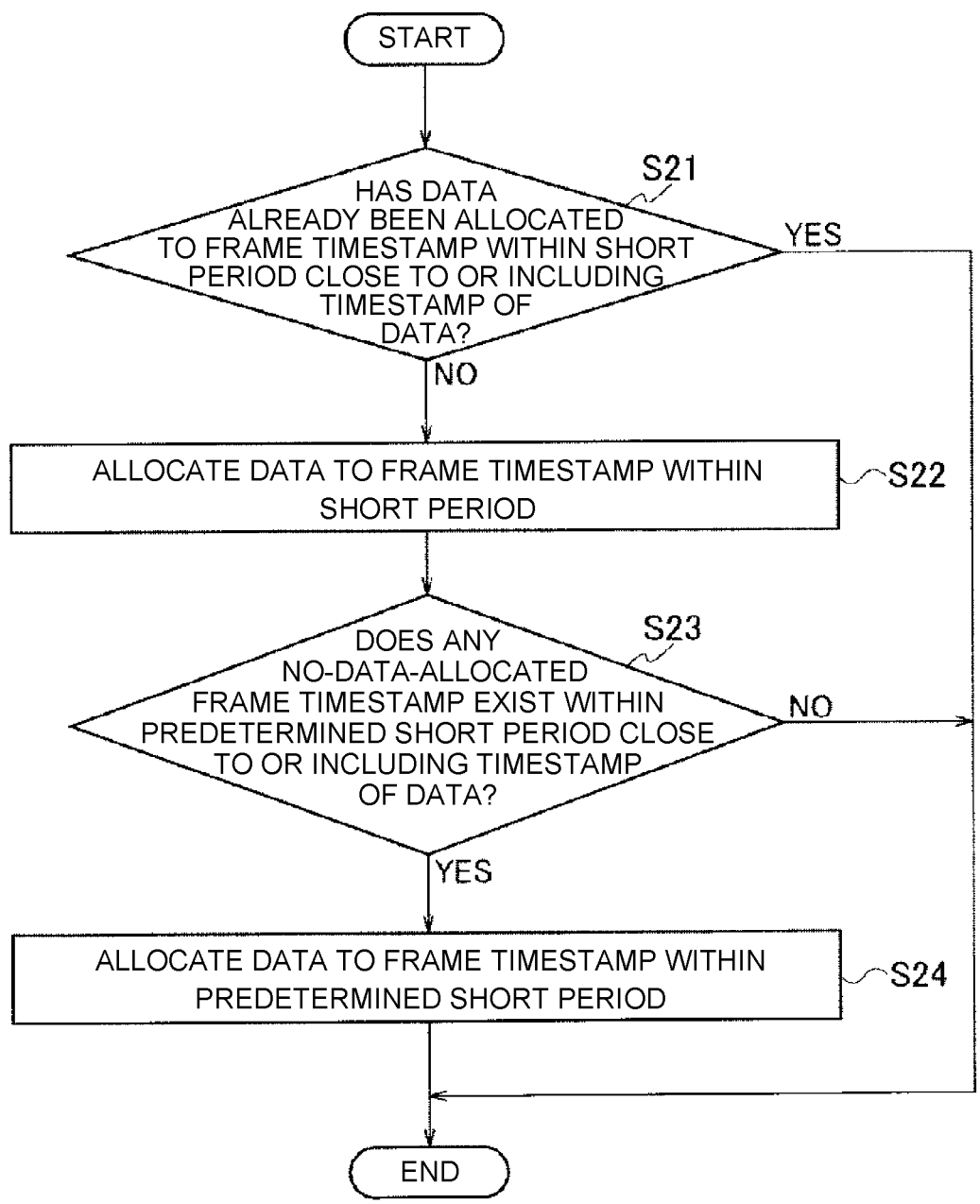
FIG. 12 is a flowchart illustrating a process flow of a sensor information synchronization unit.
Figure 13:
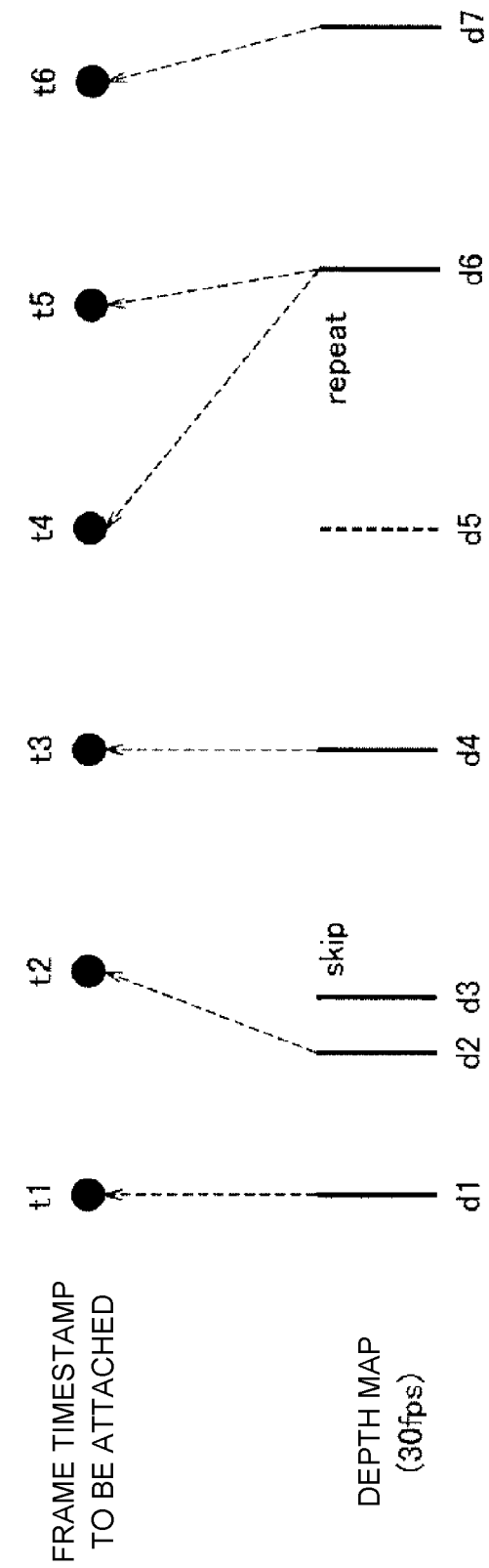
FIG. 13 is a diagram for specifically describing a process of a sensor information synchronization unit.

FIG. 12 is a flowchart illustrating a process flow of the sensor information synchronization unit 16A. FIG. 13 is a diagram for specifically describing the process of the sensor information synchronization unit 16A. In FIG. 13, t1 to t6 denote the reference timestamps, and denote frame timestamps t1 to t6 based on the timestamp of the video. In the example of FIG. 13, depth maps d1 to d7 are received. However, the depth map d5 is lost data.

The sensor information synchronization unit 16A determines whether data has already been allocated to a frame timestamp within a short period close to or including a timestamp of data (depth map) to process (step S21). When no data has been allocated to the frame timestamp within the short period (NO in step S21), data is allocated to the frame timestamp within the short period (step S22). For example, no data has been allocated to the frame timestamp t1 within a short period close to or including a timestamp of the depth map d1, thus the depth map d1 is allocated to the frame timestamp t1. Note that allocating the depth map d1 to the frame timestamp t1 means using the depth map d1 as a depth map used to generate location information of the frame timestamp t1, that is, generating the location information of the frame timestamp t1 by using location information of the depth map d1. Similarly, the depth map d2 is allocated to the frame timestamp t2.

When data has been allocated to the frame timestamp within the short period (YES in step S21), allocation of the data is skipped, and a following data is processed. In FIG. 13, for example, the depth map d2 has been allocated to the frame timestamp t2 within a short period close to or including a timestamp of the depth map d3, thus the allocation of the depth map d3 is skipped. That is, the depth map d3 is not used.

The sensor information synchronization unit 16A determines whether a no-data-allocated frame timestamp exists within a predetermined short period close to or including timestamp of data (step S23). When the no-data-allocated frame timestamp exists (YES in step S23), the data is repeatedly allocated to the frame timestamp (step SS24). For example, the depth map d5 is assumed to be lost in FIG. 13, thus the depth map d5 to be originally allocated is unable to be allocated to the frame timestamp t4. Therefore, the depth map d6 is allocated to the frame timestamp t5 in step S22 described above and is also repeatedly allocated to the frame timestamp t4 in step S24.

On completion of processing steps S21 to S24, steps S21 to S24 are repeatedly processed with the next data as an object to process.

In the present embodiment, the predetermined period is set to be a period of two frame timestamps past from a time stamp of data, and when no data has been allocated to the past two frame timestamps, the data is repeatedly allocated up to past one frame timestamp. Note that when no data has been allocated only to the past 1 frame timestamp, no data is repeatedly allocated due to almost no effect on actual expression. In addition, when loss of data continues for a while, to repeat to all the loss requires a process to copy a large amount of data upon arrival of data to repeat, thereby may fail in terms of process speed and memory consumption. In the present embodiment, a period in which data is repeatedly allocated is limited to the predetermined period, and only one frame timestamp is handled for loss of two frame timestamps, thereby loss of data is recovered for loss of one frame timestamp. In the standard of serial digital interface (SDI) for transmitting the sensor information, fluctuation from a frame rate is within a certain range, and loss of two frame timestamps hardly occurs. Handling only one frame timestamp for loss of two frame timestamps enables recovery of loss of data.

FIG. 14 is a diagram for specifically describing a process of the sensor information synchronization unit 16B.

An arrival interval of the tracking data is wider than an interval of each of frame timestamps t1 to t6 serving as a reference for synchronization, and the data is also reliable. Thus, the sensor information synchronization unit 16B allocates, as illustrated in FIG. 14, pieces of the tracking data d1 or d2 with a timestamp closest to each of the frame timestamps t1 to t6 to a corresponding frame timestamp.

Note that, for the tracking data, a method of skipping or repeating data illustrated in FIGS. 12 and 13 may be used, or linear interpolation may be performed when the data is allocated to the frame timestamp. The same method can be applied to the depth map.

The sensor information integration unit 17 integrates the depth map and the tracking data allocated to each frame timestamp, generating location information by integrating the label of the subject and the three-dimensional coordinate information of the object. The location information transmission unit 18 transmits the MMT packet including the location information of each subject at the predetermined timing.

As described above, according to the present embodiment, the sensor information synchronization units 16A and 16B determine a frame timestamp serving as a reference and allocate at least one of the depth map and the tracking data to the frame timestamp. Then, when a frame timestamp within a short period close to or including a timestamp of the received depth map has already been allocated, the sensor information synchronization unit 16A allocates no depth map to the frame timestamp. In addition, when a no-depth-map allocated frame timestamp exists among frame timestamps within the predetermined short period close to or including a timestamp of the depth map, the sensor information synchronization unit 16A allocates the depth map. As a result, the location information delivery device 10 is capable of matching the timestamp of the received depth map and tracking data and recovering lost information while suppressing process load.

According to the present embodiment, the location information delivery device 10 matches, before transmission using MMT, the timestamp of the sensor information such as the depth map and the tracking data to the frame timestamp of the video. This allows a system using the data to utilize data having a corrected timestamp, thus enabling reduction of time and effort for implementation, and contents of processes.

Each unit included in the location information delivery devices 10 and the location information reception device 20 according to the first embodiment and the second embodiment may be configured by a computer including an arithmetic processing device and a storage device, and a process of each unit may be executed by a program. This program is stored in a storage device provided in the location information delivery device 10 and the location information reception device 20, and can be recorded in a recording medium such as a magnetic disk, an optical disc, a semiconductor memory, and the like, or can be provided through a network.

Note that a process of matching and integrating timestamps of a plurality of pieces of sensor information of the second embodiment may be combined with the first embodiment.

REFERENCE SIGNS LIST

1 Transmission apparatus
10 Location information delivery device
11 Sensor information integration unit
12 Reception unit
13 Buffer
14 Location information interpolation unit
15 Location information transmission unit
16A, 17B Sensor information synchronization unit
17 Sensor information integration unit
18 Location information transmission unit
20 Location information reception device
21 Location information reception unit
22 Frame rate conversion unit
23 Location information output unit
30 Media encoder
40 Media decoder
50 Video and audio output device

The invention claimed is:

1. An information synchronization device configured to synchronize, to a reference timestamp, data in which one or more labels for identifying respective one or more subjects on a video and one or more pieces of location information for identifying respective locations of the one or more subjects are respectively associated, the information synchronization device comprising:
    a reception unit, including one or more processors, configured to receive the data at each time;
    a buffer configured to store the received data;
    a location information interpolation unit, including one or more processors, configured to generate, upon pieces of the location information at times before and after the reference timestamp being stored into the buffer for any of the labels, location information of the label at the reference timestamp by interpolation using the pieces of the location information; and
    a location information synchronization unit, including one or more processors, configured to allocate the location information to the reference timestamp at a time within a short period close to or including a timestamp of the location information, wherein
        the location information synchronization unit allocates, when another piece of location information has already been allocated to the reference timestamp to which the location information is to be allocated, no location information to the reference timestamp, and allocates the location information to the reference timestamp to which no location information has been allocated among reference timestamps within a predetermined period close to or including the timestamp of the location information.

2. The information synchronization device according to claim 1, comprising a frame rate conversion unit, including one or more processors, configured to convert and transmit a frame rate of the location information at the reference timestamp.

3. The information synchronization device according to claim 1, wherein the location information synchronization unit is configured to allocate, when no location information has been allocated to two reference timestamps at a time before the timestamp of the location information, the location information to one of the two reference timestamps.

4. An information synchronization method of synchronizing, to a reference timestamp, data in which one or more labels for identifying respective one or more subjects on a video and one or more pieces of location information for identifying respective locations of the one or more subjects are respectively associated, the method comprising:

receiving, by a computer, the data at each time;

storing, by the computer, the received data into a buffer;

generating, by the computer, upon pieces of the location information at times before and after the reference timestamp being stored into the buffer for any of the labels, location information of the label at the reference timestamp by interpolation using the pieces of the location information; and allocating, by the computer, the location information to the reference timestamp at a time within a short period close to or including a timestamp of the location information, wherein allocating the location information comprises:
allocating, when another piece of location information has already been allocated to the reference timestamp to which the location information is to be allocated, no location information to the reference timestamp, and allocating the location information to the reference timestamp to which no location information has been allocated among reference timestamps within a predetermined period close to or including the timestamp of the location information.

5. The information synchronization method according to claim 4, further comprising:

converting, by the computer, and transmit a frame rate of the location information at the reference timestamp.

6. The information synchronization method according to claim 4, further comprising:

allocating, by the computer when no location information has been allocated to two reference timestamps at a time before the timestamp of the location information, the location information to one of the two reference timestamps.

7. A non-transitory computer readable medium storing one or more instructions causing a computer to operate as an information synchronization device configured to synchronize, to a reference timestamp, data in which one or more labels for identifying respective one or more subjects on a video and one or more pieces of location information for identifying respective locations of the one or more subjects are respectively associated, the one or more instructions causing the computer to execute: receiving, by the computer, the data at each time;

storing, by the computer, the received data into a buffer;

generating, by the computer, upon pieces of the location information at times before and after the reference timestamp being stored into the buffer for any of the labels, location information of the label at the reference timestamp by interpolation using the pieces of the location information; and allocating, by the computer, the location information to the reference timestamp at a time within a short period close to or including a timestamp of the location information, wherein allocating the location information comprises:
allocating, when another piece of location information has already been allocated to the reference timestamp to which the location information is to be allocated, no location information to the reference timestamp, and allocating the location information to the reference timestamp to which no location information has been allocated among reference timestamps within a predetermined period close to or including the timestamp of the location information.

8. The non-transitory computer readable medium according to claim 7, wherein the one or more instructions further cause the computer to execute:

converting, by the computer, and transmit a frame rate of the location information at the reference timestamp.

9. The non-transitory computer readable medium according to claim 7, wherein the one or more instructions further cause the computer to execute:

allocating, by the computer when no location information has been allocated to two reference timestamps at a time before the timestamp of the location information, the location information to one of the two reference timestamps.

* * * * *